UNITED STATES PATENT OFFICE.

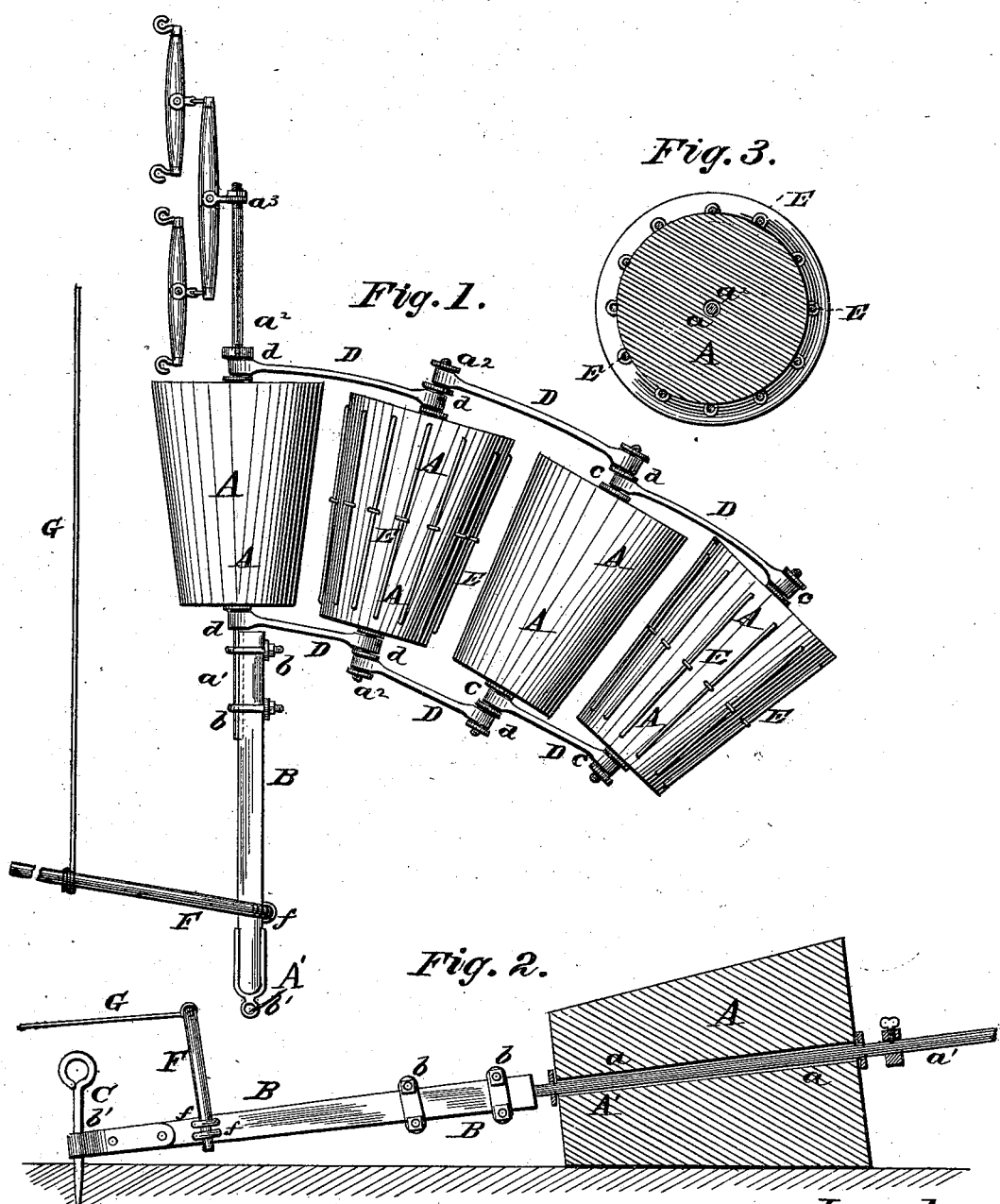

JAMES W. CROOKS, OF STRAWTOWN, INDIANA, ASSIGNOR OF ONE-HALF OF HIS RIGHT TO RICHARD A. CONDEN, OF SAME PLACE.

IMPROVEMENT IN FLAX-THRASHING MACHINES.

Specification forming part of Letters Patent No. 222,462, dated December 9, 1879; application filed September 16, 1879.

*To all whom it may concern:*

Be it known that I, JAMES W. CROOKS, of Strawtown, in the county of Hamilton and State of Indiana, have invented certain new and useful Improvements in Flax-Thrashing Machines; and I do hereby declare the following to be a full, clear, and exact description of the same, reference being made to the accompanying drawings, forming a part of this specification, and in which—

Figure 1 is a top or plan view of my improved machine; Fig. 2, a side view, with a vertical section through one of the rollers; Fig. 3, a transverse section through one of the rollers.

This invention relates to certain new and useful improvements in machines especially designed for thrashing or rolling out flaxseed to be used on the ground in the field, or on a platform or large barn-floor, having for its object the production of a machine wherein the flax-bolls containing the seed are subjected to the weight of heavy rollers concentrated in a small space for crushing the tough flax-bolls, and also to the obtaining of the best leverage for horse-power to be applied thereto for operating the machine; and to this end the invention consists in the general construction and arrangement or combination of parts, all as will be hereinafter fully described, and specifically pointed out in the claims.

To enable others skilled in the art to which my invention is most nearly connected to make and use the same, I will now proceed to describe the construction and operation of the several parts.

In the drawings, A represents a series of rollers or frustums of cones, whose apex is at A', with the base of the cones at the circumference of the circle, the apex of the cones, of which the rollers are the frustums, being at the center of the circle.

The first and second rollers of the series have journal-holes $a$ through them for the reception of the shafts $a'\ a^2$. The shaft $a'$, passing through the first roller of the series, projects a short distance beyond the large end thereof, and is provided with an eye, $a^3$, by which, through the medium of a common clevis, a double or single tree can be secured thereto, whereby horse-power can be applied for operating the machine, and which being outside of the circumference of the circle in which the rollers travel, greater leverage is obtained for the horse or horses operating the machine.

The shaft $a'$, passing through the first roller of the series, also projects a short distance beyond its smallest end, where it is grooved into a piece of timber, B, termed a "tongue," and secured by means of clevis or other suitable clamps $b\ b$. This tongue B extends to the center A' of the circle, and is provided at that end with a broad iron eye, $b'$, securely bolted thereto, and through said eye $b'$ passes a stake, C, which is driven into the ground, thus securing the machine in position, and forming a central point, around which the machine travels. The shaft $a^2$, passing through the second roller of the series, also projects a sufficient distance to receive two sets of coupling or draw bars, D D, by which it is connected with the first and the third roller of the series, said bars D being provided with suitable eyes, or journal-holes $d$, through which the shafts and gudgeons of the rollers pass, the third and fourth rollers of the series being provided with gudgeons $c\ c$ at each end, and connected together by similar coupling or draw bars D, said draw-bars forming flexible connections, whereby the rollers are adapted to conform to the surface of the ground or bed.

Two alternate rollers of the series are clothed or provided on their exterior surfaces with a series of iron rods or staples, E, secured thereto in any suitable manner. The object of these iron rods or staples is to concentrate all the weight of the rollers in a small space, so as to crush the tough flax-bolls containing the seed, and as said rods or staples tend to leave the straw uneven or in ridges, the smooth roller following will tend to level the straw, pack it firm, and operate to crush the flax-bolls to the bottom of the bed of straw, or at least all of the dry flax-bolls.

Two staples, $f\ f$, on the tongue B are used to secure a lead-pole, F, which is connected with the bridle or bit of the harness on the horse by a lead-rein, G.

The first and second rollers of the series have boxes in them for the reception of the shaft, for lessening friction, and consequently wear.

In case the rods or staples E on two rollers are not fully efficient on the tough flax-bolls, the third roller of the series can also be provided with said rods or staples, in which case there would only be one plain or smooth roller in the series for the dry flax-bolls, and which can be either the first or last of the series of rollers, as may be deemed expedient.

In the present instance the machine is intended for two horses, and which are connected to the machine by a double-tree at the outer extremity of the shaft $a'$ of the first roller of the series, all as clearly shown in Fig. 1.

The operation of my improved machine is as follows: A suitable circular bed of flax having been formed on the ground, or on a suitable platform or barn-floor, the machine secured in position by the central stake, C, and the horses connected thereto, as described, the horses draw the rollers around over the bed of straw until the seeds are rolled or crushed out of the flax-bolls in the manner above described, the lead-pole and lead-rein causing the horses to travel in the path of a circle outside of the circumference of the bed over which the rollers travel.

Having thus fully described my invention, what I claim as new, and desire to secure by Letters Patent, is—

1. In a machine for thrashing or rolling out flaxseed, a series of three or more rollers forming frustums of cones, connected together by flexible coupling or draw bars D, and adapted to be connected to and travel around the central or apex point of the rollers, substantially in the manner herein shown and described.

2. In a machine for thrashing or rolling out flaxseed, the combination of one or more rollers provided with exterior rods or staples, E, and one or more smooth or plain rollers suitably connected together, substantially as and for the purpose herein shown and described.

3. In a machine for thrashing or rolling out flaxseed, composed of a series of rollers connected together by coupling or draw bars D, the first roller of the series provided with a shaft, $a'$, passing entirely through and projecting beyond the ends of said roller, having an eye or its equivalent at its outer end, and connected at its inner end with a tongue, B, provided with an eye, $b'$, for the reception of a stake, C, the several parts constructed and relatively arranged to operate substantially in the manner herein shown and described.

JAMES W. CROOKS.

Witnesses:
AUGUSTUS F. SHIRTS,
JOHN B. FOULKE.